United States Patent [19]

Abadi

[11] Patent Number: 5,021,096
[45] Date of Patent: Jun. 4, 1991

[54] METHOD FOR REMOVAL OF SCALE

[76] Inventor: Khodabandeh Abadi, 5042 E. Camino Alisa, Tucson, Ariz. 85718

[21] Appl. No.: 501,312

[22] Filed: Mar. 26, 1990

Related U.S. Application Data

[63] Continuation of Ser. No. 269,625, Nov. 10, 1988, abandoned.

[51] Int. Cl.$^5$ ............................ B08B 9/06; C02F 5/08
[52] U.S. Cl. ................................ 134/22.14; 134/22.19; 252/82
[58] Field of Search ........................... 134/22.14, 22.19; 252/82

[56] References Cited

U.S. PATENT DOCUMENTS

| | | | |
|---|---|---|---|
| 3,003,898 | 10/1961 | Reich | 134/22.19 |
| 3,003,899 | 10/1961 | Eberhard | 252/142 |
| 3,072,502 | 1/1963 | Alfano | 134/22.19 |
| 4,595,517 | 6/1986 | Abadi | 252/82 |
| 4,802,990 | 2/1989 | Inskeep | 210/699 |

FOREIGN PATENT DOCUMENTS 0233110 8/1987 European Pat. Off. ............. 252/82

OTHER PUBLICATIONS

"The Kirk-Othmer Encyclopedia of Chemical Technology", vol. 13, 3rd Ed., John Wiley 1981, p. 94.
"Boosting Capacities with Chemicals", Chemical Engineering, Feb. 26, 1973, pp. 79–84.

Primary Examiner—Olik Chaudhuri
Assistant Examiner—Ourmazd S. Ojan
Attorney, Agent, or Firm—Thomas H. Whaley

[57] ABSTRACT

A method for removal of scale from heat transfer equipment in which the scale contaminated surface is first contacted with a cleaning composition consisting essentially of an aqueous solution of hydroxyacetic acid and a polysaccharide gum and then contacted with a dilute aqueous solution of citric acid.

5 Claims, 1 Drawing Sheet

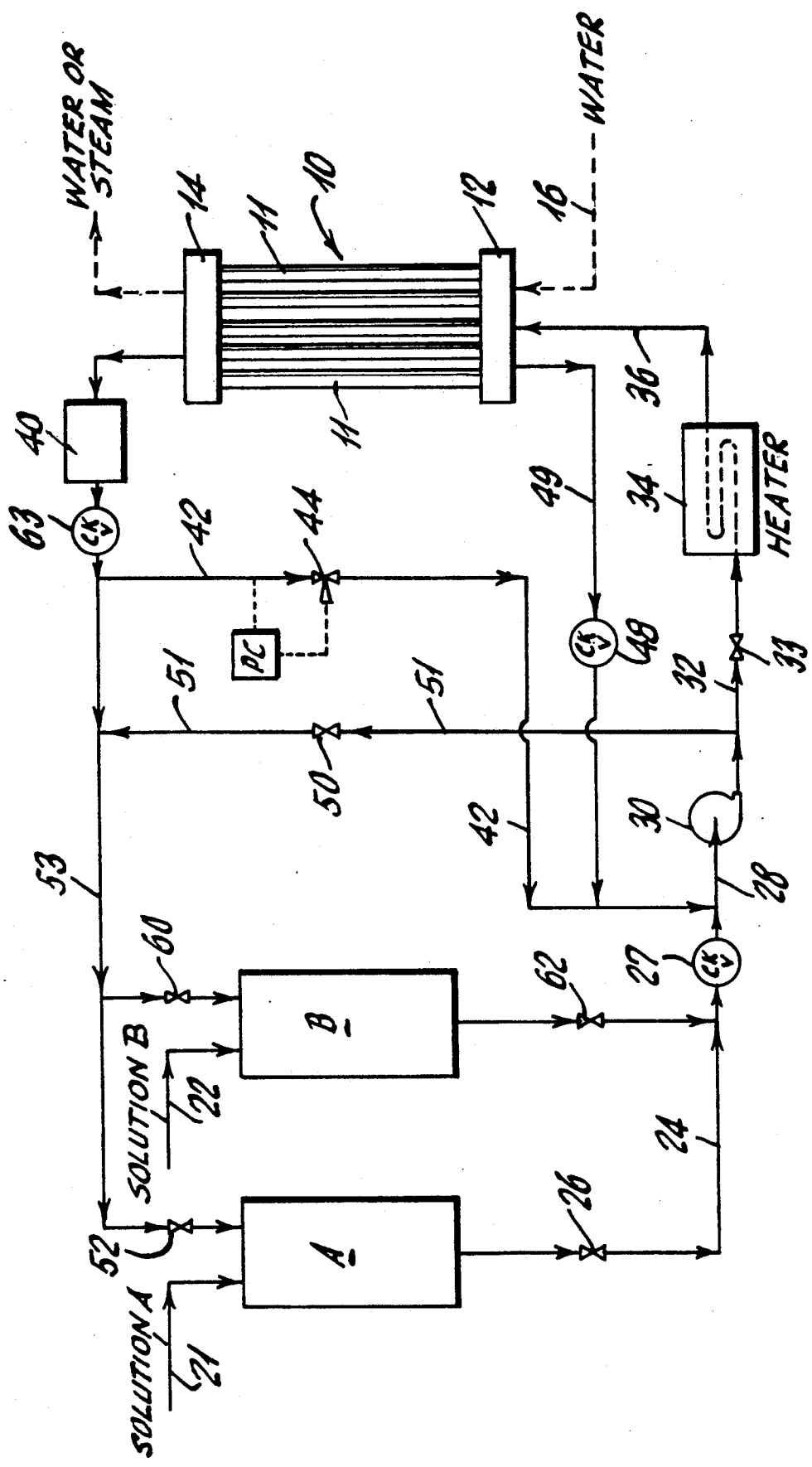

METHOD FOR REMOVAL OF SCALE

This is a continuation of application Ser. No. 269,625, filed Nov. 10, 1988, now abandoned.

This invention relates to an improved method for removal of scale deposits from metal surfaces. In one of its more specific aspects, it relates to a method for removal of scale deposits from heat exchange surfaces, e.g. from boilers, evaporation pans, steam generators, automobile radiators, and the like. The method of this invention is particularly useful for descaling the inner surfaces of heat exchange tubes or coils which are not easily cleaned by mechanical means.

In accordance with the method of this invention, heat transfer surfaces are contacted sequentially with an aqueous solution of hydroxyacetic acid and polysaccharide gum (Solution A) for a period of time sufficient for substantially complete reaction of the scale, followed by an aqueous solution of citric acid (Solution B) effecting solution and removal of the deposits from the surface subjected to the cleaning operation. This method results in rapid and effective cleaning of metal surface contaminated with iron oxide-containing hard water scale without the need for mechanical scraping, or the use of strong mineral acids or inhibitors.

Fouling of heat exchange surfaces with accumulations of hard water scale has been a major problem in industry for a long time. Fouling occurs when any deposit forms on heat transfer surfaces, which inhibits the transfer of heat. Fouling occurs in most heat transfer equipment, including boilers, steam generators, distillation units, piping systems, evaporative cooling systems, condensers, pumps, tanks, valves, radiators and coils.

The accumulation of solid deposits, or fouling, causes three potentially serious problems. Firstly, fouling leads to inefficient thermal transfer, resulting in suboptimal equipment performance and high energy costs. Secondly, fouling can cause physical damage to heat exchange equipment, thereby increasing repair and replacement costs. Finally, fouling can cause damage (often costly) to machinery or systems associated with heat transfer equipment. These problems can be alleviated if the heat exchange system is cleaned prior to the point when fouling will tend to increase production and maintenance costs.

Fouling of heat transfer equipment may take place by two types of solid accumulations or deposits on the surfaces and in the passageways of the apparatus. The first type is known as precipitation fouling or scaling. Scale deposits usually continue to form on the water wet surfaces of the equipment as hard, refractory accumulations of lime. The second type is induced sedimentation fouling which results from accumulations of metal oxide or "mud" in the passageways or tubes on the water side of the heat transfer apparatus.

Defouling technology today mainly employs mineral acids, organic acids or a combination of mineral and organic acids. Aqueous acid solutions are circulated, sometimes at elevated temperatures, through the heat transfer system being cleaned. Circulation of the cleaning solution allows for the removal of layer after layer of deposits and helps to prevent system clogging, which may occur under static conditions when reaction products of the deposits are solid or semi-solid and of sufficient volume to block the passageways of the heat transfer apparatus.

Mineral acids are often inhibited to protect exposed metallic surfaces within the system being cleaned. Although inhibitors, used in conjunction with mineral acids, may provide a certain degree of safety, there are still problems encountered with use of mineral acids. One major problem involves danger to the personnel handling these corrosive solutions. Other problems include a need for frequent monitoring or observation of the system surfaces during cleaning and problems of disposal of mineral acid solutions at the end of the cleaning process.

Methods of descaling metal surfaces are disclosed in various prior art patents. My U.S. Pat. No. 4,595,517, incorporated herein by reference, discloses a descaling composition consisting essentially of an aqueous solution of an aliphatic carboxylic acid containing 2 to 5 carbon atoms per molecule in combination with a natural gum or synthetic polymeric thickener which is water soluble at a pH of 3 or below, optionally containing sodium silicate. U.S. Pat. No. 3,033,899 to Eberhard et al. discloses a method of removing iron oxide-containing scale from the interior of heat exchange tubes by treatment with an aqueous solution of citric acid or formic acid at a temperature of 100° F. to 212° F. for a period of at least one hour.

I have now discovered an improved method of removing scale, including iron oxide-containing scale from scale contaminated surfaces by a two-step method of first reacting the scale with an aqueous solution of carboxylic acid and a polysaccharide gum (Solution A) for a period of time within the range of from about 1 to about 24 hours sufficient to dissolve and emulsify the scale deposits and thereafter dissolving solid and semi-solid products of reaction of the scale and the carboxylic acid with a dilute aqueous solution of citric acid (Solution B) for a period of time in the range of 0.3 to 5 minutes. This combination treatment cleans the metal surface without the need for an inhibitor to protect the metal surface from acid attack as necessary in prior art methods for chemical removal of scale.

My method involves a unique two-step treatment utilizing two solutions (A and B) to remove detrimental fouling deposits from heat transfer surfaces without affecting metallic system surfaces. Such deposits usually result from the oxidation of metal to metal oxides and the simultaneous deposition of calcium and magnesium carbonates. In the present method, Solutions A and B are circulated sequentially within a heat transfer system to emulsify and remove fouling deposits. The treating temperature is elevated and pressure is applied to accelerate the reaction rates and decrease the time required to clean a scale-fouled system.

Both laboratory and field tests have shown the present system to be a very effective method for removing detrimental scale deposits from heat transfer surfaces. Solutions A and B are safe to personnel handling them, noncorrosive to metal surfaces and biodegradable.

The deposits present in heat transfer systems consist mainly of precipitation deposits and corrosion induced sedimentation deposits. Deposition occurs when supersaturation conditions of compounds within the system solution prevail. Supersaturation need only exist with respect to the heat transfer surface and not necessarily in the bulk solution.

The most common forms of precipitation deposits are calcium and magnesium carbonates ($CaCO_3$, $MgCO_3$). These salts are present in water as a dilute solution of their bicarbonate forms, namely, $Ca(HCO_3)_2$ and $Mg(HCO_3)_2$. Precipitation occurs when the bicarbonate concentration becomes supersaturated with respect to the heat transfer surfaces. The bicarbonate then reverses to its carbonate salt form.

$$Ca(HCO_3)_2 \rightarrow CaCO_3 + CO_2 + H_2O$$

Supersaturation may occur in three ways. Firstly, a solution may become evaporated beyond its solubility limit of the dissolved salt. Secondly, a solution containing a dissolved salt of normal solubility is cooled below its solubility temperature or a solution containing dissolved salts of inverse solubility is heated above its solubility temperature. Finally, mixing of different streams may also lead to supersaturation conditions. Deposition of the salt onto heat transfer systems will continue as long as supersaturation conditions prevail.

The second main constituent of fouling deposits is corrosion induced sedimentation. The most common deposit is formed by the oxidation of iron to magnetite on the surface metal.

$$3Fe + 4H_2O \rightarrow Fe_3O_4 + 4H_2$$

As is the case with precipitation fouling, deposition of magnetite occurs only in the supersaturation state.

The initial deposit of magnetite encourages further corrosion which will often produce a local charge in the surroundings as the result of hydrolysis of the primary corrosion product. If the corrosion product is magnetite, it is hydrolyzed to form hematite. One other form of iron oxide may occur, wüstite. Wüstite is formed at the interface where the poor availability of oxygen and electron donating properties of the substrate favor its formation. The deposit tends to form in successive layers, i.e. wüstite (FeCO), magnetite ($Fe_3O_4$), hematite ($Fe_2O_3$) and scale ($CaCO_3$; $MgCO_3$). The method of this invention successfully removes all of the layers without detriment to the underlying metal surfaces.

BRIEF DESCRIPTION OF THE DRAWING

The method of this invention is illustrated in the accompanying drawing wherein the figure is a diagrammatic flow sheet representing apparatus suitable for carrying out the method.

DETAILED DESCRIPTION OF THE INVENTION

With reference to the drawing, a heat exchanger 10 is illustrated in which heat exchange tubes 11 are connected to headers 12 and 14 through which water is circulated. Heat exchanger 10 may be the radiator of an internal combustion engine, a steam generator or condenser, or other similar heat exchange equipment. In normal operation water from line 16 enters header 12, flows through tubes 11 to header 14, and water or steam is discharged through line 18. Scale formed on the interior surfaces of tubes 11 and headers 12 and 14 is removed as follows. An aqueous solution (Solution A) of hydroxyacetic acid and xanthan gum is charged to tank A through line 21 and an aqueous solution (Solution B) of citric acid introduced to tank B through line 22. As a specific example, the solution in tank A contains 12 percent by weight hydroxyacetic acid and 0.3 weight percent Kelzan S brand xanthan gum marketed by the Kelco Division of Merck and Co. The solution in tank B contains 1 weight percent citric acid.

In a preferred procedure for cleaning the scale-fouled surfaces of heat exchanger 10, Solution A is drawn from tank A through line 24, as controlled by valve 26, and passed through check valve 27 and line 28 to pump 30. From pump 30 the solution is discharged through line 32 and valve 33 to heater 34 where it is heated to the desired temperature, in this specific example, to a temperature in the range of from about 80° to about 350° F. (27° to 177° C.). From heater 34, the solution is passed through line 36 into header 12 of heat exchanger 10 passing through tubes 11 to header 14. From header 14, the solution is discharged through line 38 to filter 40 which removes loosened scale and other solid particles from the cleaning solution prior to recirculation to pump 30 through check valve 63 and line 42. A pressure controller 44 maintains sufficient pressure to prevent vaporization of the solution in the heat exchanger 10 during the cleaning operation. In this example the pressure is maintained at about 60 psig and the temperature of the cleaning solution is about 300° F. In this example, circulation is continued for about four hours during which substantially all deposits are removed or emulsified. At the end of the cleaning period with Solution A, the solution is permitted to cool, valve 33 is closed and valves 50 and 52 in lines 51 and 53 are opened, draining cleaning solution from heat exchanger 10 through line 49 and check valve 48 and returning it to tank A. Air may be introduced into heat exchanger 10 through line 18 to facilitate draining of solution A from the heat exchanger.

After removal of Solution A, Solution B is circulated through the heat exchanger 10 by closing valves 50, 52, and 26 and opening valves 60, 62, and 33 allowing Solution B to pass through pump 30, heater 34, heat exchanger 10, and filter 40 and return to tank B through line 53. In this specific example, Solution B is circulated at a temperature of 190° to 200° F. at atmospheric pressure until all sludge is removed from the water passageways of the heat exchanger, usually within about one to about five minutes after which solution B is drained from heat exchanger 10 and the heat exchanger may be then returned to service.

The treatment with Solution A loosens and dissolves scale from the fouled heat exchange tubes, converting some of the scale to a sludge or gelatinous residue which often remains in the heat exchanger in those areas which are not in the direct flow path of the cleaning solution, e.g. in some return bends and in headers. When the heat exchanger is returned to normal operation, the sludge may migrate into the water tubes causing plugging of the tubes or reduced water flow especially in thermosiphon systems. Solution B effectively dissolves and removes trace deposits and the residues left as reaction products of Solution A with scale, resulting in clean metal surfaces and absence of sludge.

Organic acids useful in the method of this invention are aliphatic alpha-hydroxy carboxylic acids containing 2 to 5 carbon atoms per molecule. Hydroxyacetic acid is preferred from the standpoint of both cost and availability. Polysaccharide gums which are stable in acid media include, inter alia, xanthan gum, gum tragacanth, guar gum and locust bean gum. Of the various gums suited for use in Solution A, xanthan gums are preferred. Xanthan gum marketed under the trade name Kelzan-S by the Kelco Division of Merck & Co. is a preferred gum for use in the method of this invention. Laboratory tests to determine the ability of Solution B to dissolve sludge residue resulting from reaction of Solution A with metal oxide-containing scale were carried out by contacting sludge with aqueous solutions of citric acid in concentrations ranging from 0.5 weight percent acid to 5 weight percent acid all of which effectively dissolved the sludge. Concentrations in the range of 1 to 5 percent acid by weight in water dissolved sludge in less than 20 seconds.

The method of this invention for cleaning heat transfer equipment was demonstrated in a field test in which heat transfer equipment was defouled with 80 to 100 percent effectiveness in an average time of 4 to 6 hours depending upon the extent of scale buildup by sequential treatment with Solution A followed by Solution B as described herein.

What is claimed is:

1. A method for the removal of iron oxides and hard water scale from scale-contaminated surfaces of a heat exchanger which comprises circulating a composition consisting essentially of an aqueous solution containing from 2 to about 20 weight percent hydroxyacetic acid and from about 0.001 to about 0.3 weight percent polysaccharide gum through said heat exchanger for a period of time in the range of from about one to about twenty four hours thereby effecting removal of scale from said scale-contaminated surface with the formation of a gelatinous residue or sludge which remains in the heat exchanger in those areas not in the direct path of flow of said-composition, and thereafter circulating a water solution of citric acid containing from about 0.5 to about 5 weight percent citric acid through said heat exchanger for a period of time in the range of from about one to about five minutes thereby dissolving and removing said gelatinous residue and sludge from said heat exchanger.

2. A method as defined in claim 1 wherein the polysaccharide gum is xanthan gum.

3. A method as defined in claim 1 wherein the concentration of hydroxyacetic acid is in the range of from about 8 to about 12 weight percent and the concentration of polysaccharide gum is in the range of from about 0.2 to 0.3 percent by weight.

4. A method as defined in claim 1 wherein the citric acid solution is maintained in contact with said surface for a period of time within the range of from about one to about five minutes.

5. A method as defined in claim 1 wherein the solution of hydroxyacetic acid in contact with the heat exchange surfaces is maintained at a temperature in the range of from about 80° F. to about 350° F. at sufficient pressure to prevent vaporization of said solution.

* * * * *